May 17, 1966  E. S. STICKLEY ETAL  3,251,702
COLD WATER DISPERSIBLE CEREAL PRODUCTS
AND PROCESS FOR THEIR MANUFACTURE
Filed June 21, 1960
2 Sheets-Sheet 1
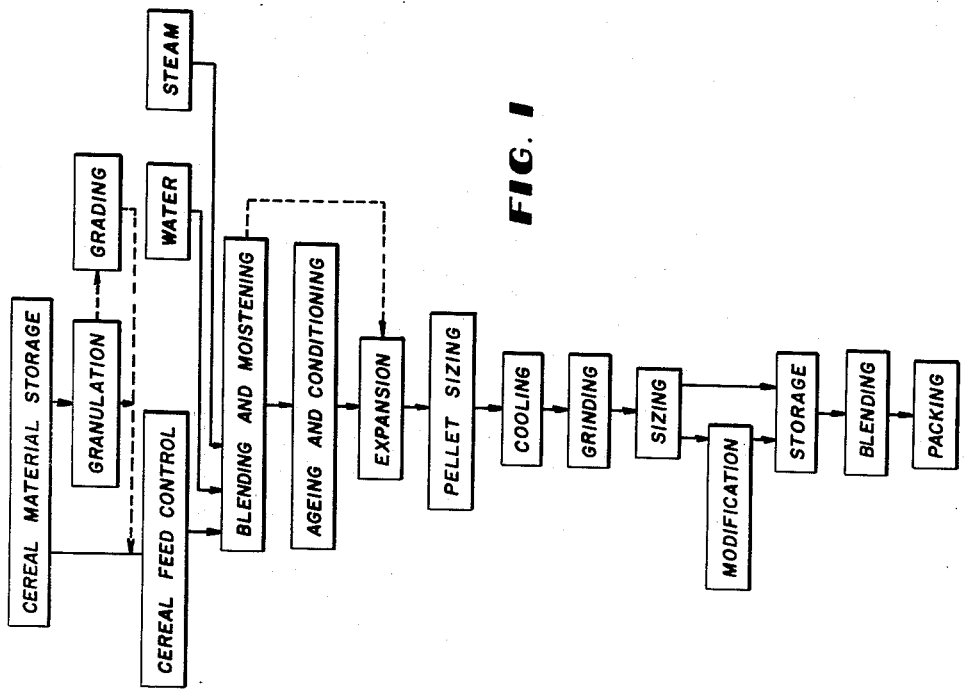
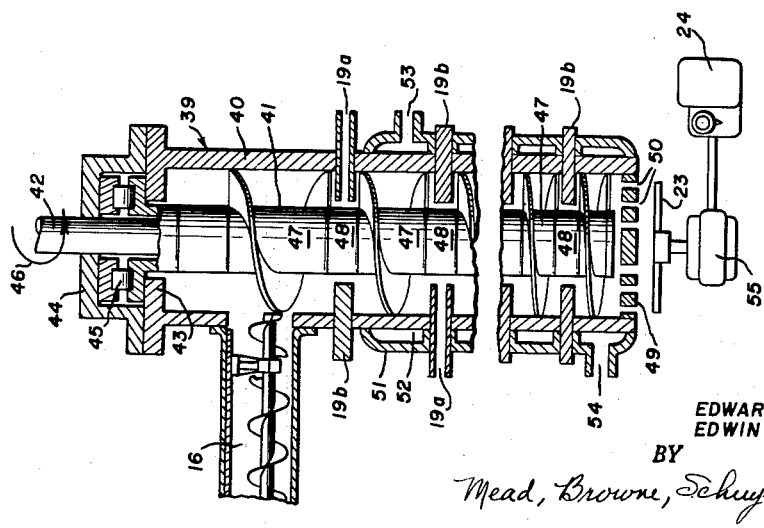
INVENTORS
EDWARD S. STICKLEY
EDWIN GRIFFITH
BY
Mead, Browne, Schuyler + Beveridge
ATTORNEYS INVENTORS
EDWARD S. STICKLEY
EDWIN GRIFFITH
BY
Mead, Browne, Schuyler + Beveridge
ATTORNEYS

United States Patent Office 3,251,702
Patented May 17, 1966

3,251,702
COLD WATER DISPERSIBLE CEREAL PRODUCTS AND PROCESS FOR THEIR MANUFACTURE
Edward S. Stickley and Edwin Griffith, Dodge City, Kans., assignors to Grain Products, Inc., Dodge City, Kans., a corporation of Kansas
Filed June 21, 1960, Ser. No. 37,765
10 Claims. (Cl. 106—122)

This invention relates to products derived from starch-containing cereal materials, said products being readily dispersible in cold water at ordinary temperatures and pressures, and to processes for the preparation of such products. The invention relates more particularly to cold water dispersible products consisting primarily of modified starch and protein which are particularly useful as binders, adhesives and sizes, and to improvements in the art of manufacturing these products from whole cereal grains or fragments or separates thereof.

It is known that starches, flours and modified starch products must be thoroughly dispersed by the application of heat or chemical agents, individually or in combination, to aqueous slurries thereof, in order that they may be used effectively in many industrial and food applications. In many instances, the user prepares the dispersion or paste by cooking or chemical treatment, or both, immediately prior to its application; however, there are numerous instances in which it is desirable, or even necessary, that the starch or modified starch product be of such character as to attain the desired colloidal dispersion in cold water without either cooking or chemical treatment by the user, and yet be supplied to the user in essentially dry powder form. Many products are now available in the required dry form with varying degrees of cold water dispersibility. These are known severally as pregelatinized starches and flours, cold swelling starches and dextrines. These may be produced by one of several well known processes. The pregelatinized products are produced from moistened starches or starch-bearing materials or mixtures by gelatinization and by subsequent or simultaneous drying of the resultant pastes or dispersions to form the final dry products. To conduct these processes, various forms of hot rolls and spray dryers are employed, often preceded by some type of continuous heat exchanger within which the slurry or cake may be precooked at atmospheric or elevated pressure so as to impart controlled dispersibility or some desired degree of modification to the final product.

In one widely adapted process of the known art, a slurry or moist cake of starch or flour or starch-gluten mixture, with or without preliminary cooking or modification, is passed between pairs of steam-heated rotating drums which complete the gelatinization to the desired degree and simultaneously dry the paste to a flaky dry solid product. The latter may be used in this form or may be reduced to finer powder by grinding as in a hammer mill or other means. In another example of the known art, the moist starch may be suspended for a short time in hot air of high humidity, as in a spray dryer, to accomplish the gelatinization and drying.

In still another type of known process, pregelatinized starchy products, though generally of limited viscosity and dispersibility, are produced by passage of a conditioned cereal grit or coarse meal between the gas-fired rolls of a flaking mill, whereupon the combined processes of severe crushing of cereal tissues, partial gelatinization of the starch content, and drying occur simultaneously.

It is further known in the art that, in any of these processes, modification, derivatization or dextrinization of the starch may be accomplished to a desired extent prior to gelatinization, concommitant with gelatinization, or subsequent to gelatinization and drying.

From the standpoint of economy, there is considerable advantage to be gained by the use of dry milled cereal products in the production of pregelatinized or cold water dispersible starchy products for many industrial applications. By dry milled cereal products, we mean cereal grains and fragments or separates thereof produced by essentially dry processes, in contradistinction to the more or less pure starches and starch-gluten mixtures deriving from so-called wet milling operations. Said dry milled products will be understood to include the whole cereal grains themselves, grains with much or all of the seedcoats removed, or individual tissues such as endosperms, in various particle sizes depending upon the types of separations performed during the milling processes and the extent of comminution of the tissues by grinding or crushing. Various terms may be employed to describe or identify these materials, such as whole grain, grits, meal, flakes or flour.

Serious limitations have been imposed upon the use of these less expensive materials, however, in that the cold water dispersible products produced from them by any of the known processes have heretofore possessed only limited dispersibility, by reason of their retention of a considerable proportion of the cellular or matrix structure or the native cereal tissues even after having been subjected to said processes. We have discoverd that cold water dispersible products of great dispersibility and therefore proportionately improved performance capabilities can be produced from such dry milled cereal materials by the processes herein disclosed.

Accordingly, it is an object of this invention to obviate the above disadvantages in the commercially available cold water dispersible starch products.

It is an object of this invention, therefore, to produce cold water dispersible products of improved characteristics said products consisting primarily of starch and protein and degradation products of starch and protein.

Another object of this invention is to provide a process for forming cold water dispersible products of improved characteristics, including a high degree of dispersibility at ambient temperatures and pressures, from starch-containing cereal materials.

Still another object of this invention is to provide a process for forming cold water dispersible cereal products from starch-containing cereal materials, wherein the properties of dispersibility are entirely separate from the acid-conversion process of the prior art necessary to obtain like cold water soluble properties.

A further object of this invention is to provide cold water dispersible starch products in dry, powdered form, suitable for use as adhesives, binders, sizes, etc., and having properties superior to known starch products.

In attaining the objects of this invention, one feature resides in moistening dry-milled cereal materials to a desired moisture content, subjecting the moistened cereal to gradually increasing temperatures and pressures while compressing and compacting the cereal into a heavy plastic mass, rapidly expanding a continuous portion of the mass, pelletizing the expanded portion, and comminuting the pellets into powdered form.

A further feature resides in modifying the resulting powdered form of starch products obtained from the comminution of the pellets by acidifying the product, holding the acidified powdered material for a predetermined period of time at increased temperatures, neutralizing the product, and then adjusting the moisture content of said product to the desired level.

Other objects, features, and advantages will become apparent from the following description of the invention taken in conjunction with the drawings, wherein:

FIG. 1 is a flow diagram illustrating the preferred embodiment of the process of the invention;

FIG. 3 is a vertical, sectional view of one type of apparatus used in compacting and compressing the cereal material into a heavy plastic mass, and then expanding a continuous portion thereof.

Figure 2:
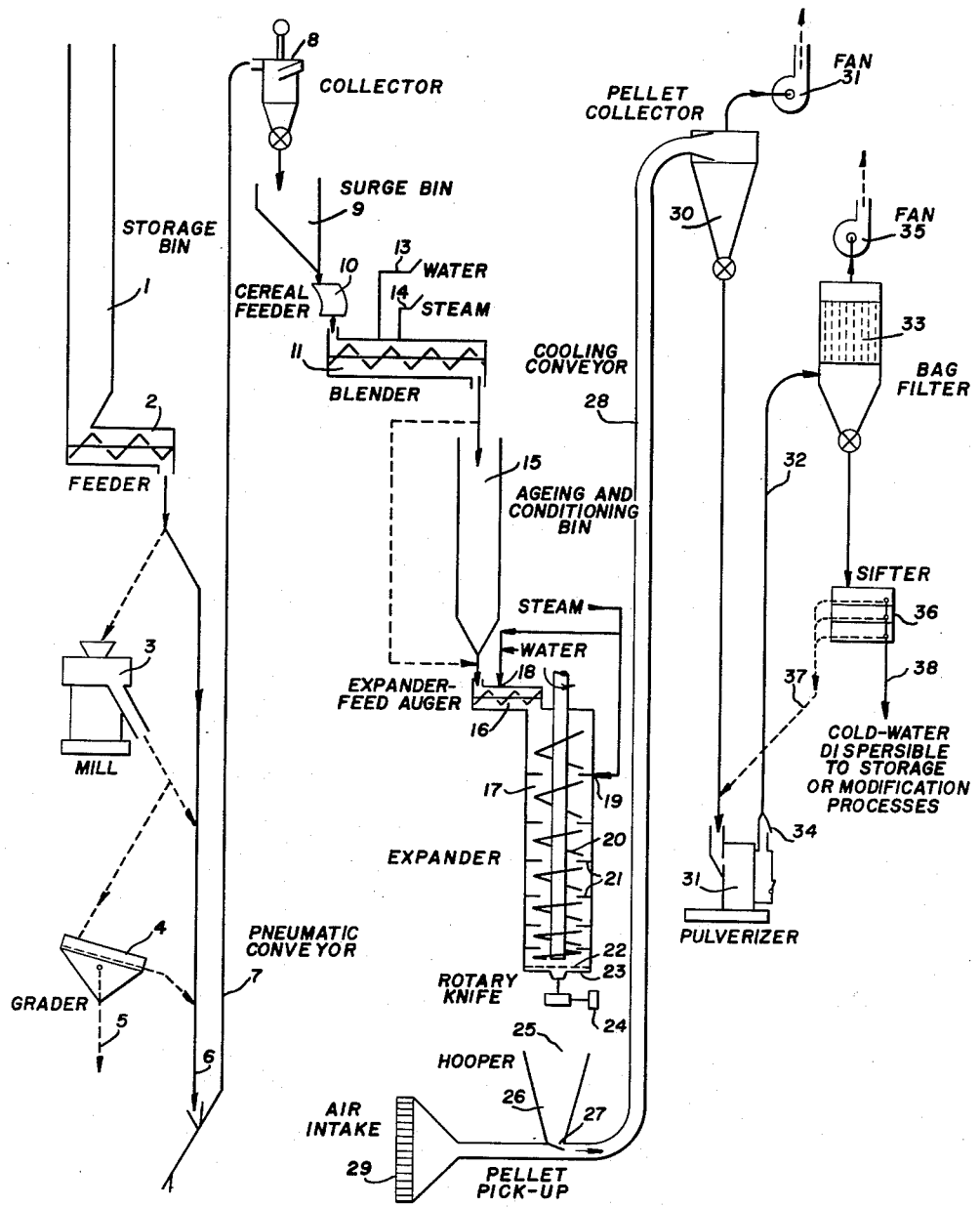
FIG. 2 is a symbolized flow diagram depicting a preferred arrangement of the process units.

The raw cereal includes whole grains, decorticated grains, and/or fragments or separates thereof, and includes corn, wheat, rye, barley, and other grains. The process will be defined with respect to cold water dispersible cereal products made from particles of cracked sorghum endospherm produced by a dry-milling process and graded therein as to size to pass through a 9-mesh wire screen, but which remain upon a 20-mesh wire screen. Such particles may be referred to as sorghum grits.

Referring to FIG. 2, it will be seen that the sorghum grits are fed from storage bin 1 through a bin-bottom volumetric feeding device 2 such as a twin-screw auger feeder, preferably with a means of adjusting the rate of feed, which means are not shown, to a pneumatic conveyor 7.

If it is desired to further reduce the particle size of the raw cereal material in the bin 1, it is fed to mill 3 which may be a buhr mill or consist of cracking rolls which provide uniform granulation with a minimum of fines. Also if desired, granulated cereal may be graded by the screen 4, which may be a 60-mesh wire screen, for removal of fines, and the fines passing therethrough are removed in the stream 5, while the selected coarser particles are delivered to the process stream 6 and pneumatic conveyor 7.

It will be apparent to those skilled in the art that the mill 3 and grader 4 may consist of a complete reduction system employing means for grinding, such as roller millas, and means for classifying the ground cereal, such as sifters, producing a flour to pass through a screen as fine as 80-mesh. Such fine flours can be used, and control of the properties of the final cold water dispersible products derives in part from the granulation of the raw cereal material.

Depending upon the properties desired for the final product and control to be exercised over the remaining steps of the process, the grading operation alone, or both the milling and grading operations may be eliminated, and the raw cereal material, such as sorghum grits from the storage bin 1 may be passed directly to the process stream 6 and pneumatic conveyor 7.

The conveyor 7 carries the sorghum grits from the storage bin 1, or after it has been milled, or milled and graded, to collector 8. While a pneumatic conveying system is preferred, other suitable means of conveying can be used, such as a bucket elevator.

From the collector 8, the products are introduced into surge bin 9 and to cereal feeder 10, which controls the rate of flow of the raw cereal material to the conditioning system, and is a form of continuous feeder of the gravimetric type or of the calibrated volumetric type, adjustable so as to deliver the raw material at the desired gravimetric rate, preferably from about 25 pounds to 100 pounds per minute.

The cereal is fed into blender 11 which comprises a continuous type of mixer, such as a single or multiple auger, a ribbon-type mixer, a paddle-type mixer, or the preferred cut-flight auger.

The size of the raw material fed into blender 11 is not critical except that the economy of over-all operations becomes an important factor. For highly dispersible and uniform final products, the particles must be evenly conditioned or tempered throughout their mass. This requires longer conditioning times for larger particles. Thus, it may be more economical to reduce the particle size so as to eliminate excessive size or number of conditioning bins. Thus, selection of particle size is not limited by the apparatus but rather by the properties of the original cereal material and of the desired final product. Examples 1 and 2, infra, show the effect of conditioning time with respect to the coarse grits.

A metered flow of water or water containing dissolved chemical agents, such as one of the mineral acids which catalyzes partial hydrolysis of starch, is also added to the blender to bring the moisture content of the cereal material up to the desired level for conditioning, namely from about 15 to 40% and preferably from about 18 to 25%. While the flow-control system has not been illustrated, such systems are available in several different types, all of equivalent utility, and their use would be apparent to those in this art.

By means of outlet pipe 14, a metered flow of steam is added into the blender to raise the temperature of the cereal material to the level desired for conditioning, namely from about 25° C. to 75° C., and preferably from about 30° C. to 60° C. Raw cereal materials absorb water more rapidly and uniformly at elevated temperatures and optimum conditions for conditioning, normally falling within the aforesaid ranges, are preferred. The maximum temperature can thus be better defined as that at which starch at the surface of the particles would begin to paste, since past formation must be prevented at this stage.

The water and steam may be mixed in a pneumatic or mixing type of spray nozzle, so that the mixture is delivered to the cereal material as a fine spray of hot droplets of water. When administered in this manner, the water is more rapidly and uniformly sorbed by the cereal material and the conditioning is thereby rendered more effective.

The moisture-containing raw cereal product is deposited into the aging or conditioning bin 15 where the moistened material may be held for periods of a few minutes up to several hours, or even days, in order for more uniform penetration of moisture to occur and, in some cases, for the partial hydrolysis of the starch content. The holding time is dependent upon granulation of the cereal material and the nature and extent of modification desired at this point in the process. In some cases, especially with finer flours, holding in the conditioning bin is not required and may be by-passed.

Chemical agents which may be added with the water in the blender 11 include the strong, nonoxidizing mineral acids, such as hydrochloric acid and sulfuric acid which catalyze hydrolytic and pyrolytic cleavage of starch. Sulfuric acid, acid salts, and even neutral salts, such as calcium chloride, may also be used. Those chemical agents which are water-soluble can best be administered in the water stream 13 while other chemical adducts can be administered in dry form into the blender 11. Chlorine, sulfur dioxide or other equivalent gaseous substances which are sorbed by the moistened cereal material can also be added, to assist in conditioning the starch, if such conditioning is necessary. The temperature in the bin 15 is maintained below that at which paste formation begins, as described supra with respect to the blender 11.

The chemical changes which occur will depend on the particular chemical additives, and will include hydrolytic cleavage of polymeric glucosidic bonds of starch and of peptide linkages of proteins; also, pyrolytic cleavage of sulfide and disulfide bonds and probably others. As far as the starch is concerned, most of the changes are classified as physical or physico-chemical changes, such as swelling, hydration, etc. Again depending upon the chemical agents added, oxidation of hydroxyl and aldehydic groups or substitution and addition reactions of hydroxyl groups may occur.

The size of the particles together with the control exercised over their conditioning is one factor in the dispersibility and viscosity properties of the final product. Thus, for products of lower degrees of dispersibility and lower solubility, coarser grits can be used by allowing a longer aging time for penetration of moisture through the grit particles. This is more economical in that it avoids the preliminary grinding operation. On the other hand, for maximum dispersibility, and especially when some modification of the starch content is desired during the conditioning step, the use of finer particles is advantageous. In either case, to provide maximum uniformity or homogeneity of properties of the final product, it is desirable that all particles of the raw material be within a limited range of particle size; preferably the coarsest particles should have diameters not greater than four times the diameter of the finest particles. It is preferred to control granulation in order to obtain a homogeneous final product.

The moistened raw cereal from blender 11 or conditioning bin 15 is introduced into the expander-feed auger 16, which feeds the conditioned material into expander 17 at a rate determined by conditions within the expander. A hot spray of steam and water, or steam alone, may be administered to the conditioned material in auger 16 as indicated at 18, in order to increase moisture content and temperature to the desired levels, preferably from about 15 to 40% moisture content and from about 25° C. to 75° C. The moisture content is dictated to considerable extent by the water sorption characteristics of the individual cereal tissue involved, and by the plastic properties of the mass in the expander prior to expansion.

As the material passes through the expander 17, it is subjected to intensive crushing and shearing actions and to increasingly tight compaction by mechanical forces induced by the combined effects of the rotating interrupted screw device 20 and the stationary members 21. The material is further subjected to gradually increasing temperatures because of mechanically generated heat, augmented by heat supplied from the steam jacket of the machine, thus giving rise to high internal pressures, due to the vapor pressures of the entrained water and other vaporizing substances. The result of this combination of conditions imposed upon this material is the disintegration of the cereal tissue and the formation of a heavy, plastic mass in which starch, protein, and other cellular components are comingled and are distinctly altered from their native state.

The starch is plasticized by the water and will expand because of its hydroxylated structure. The swelling of the starch may be considered to be a physico-chemical change wherein the hydrogen or secondary bonds are broken. In the expander, as the cereal is subjected to greater shearing, compressing and compacting action at the high temperatures and pressures, the starch within the granules becomes hydrated, which results in a weakening of the native structure of the starch so that granular structure is completely disrupted during later expansion. The result may be considered to be an unraveling of the secondary bonds of the starch as well as of the protein in the expander 17. The water is absorbed by the starch granules and other components of the cereal tissue and is in a condensed state (as $H_2O$) in the expander and is not present as steam or vapor.

Furthermore, in processes employing catalysts or chemical reagents, the starch or protein, or both, may undergo chemical as well as physical modification. Additional steam or other fluids under pressure can, if desired, be administered to this plastic mass at one or more positions indicated by 19, to impart or maintain the desired plastic properties or chemical changes. The temperatures and pressures obtained within the mass may correspond to those of the steam in the jacket; for example, 338° F. and 115 p.s.i. absolute pressure, when the gauge pressure of steam in the jacket is 100 p.s.i. This is not to be taken as limiting in any sense, since the temperatures and pressures can vary.

In operation, the minimum temperature in the expander 17 is 212° F. or that temperature at which the water will turn to steam when the plastic mass is extruded and thus cause immediate expansion of the mass. The maximum temperature should not exceed that of the steam in the water jacket, usually about 400° F., since any temperature greater than that will result in a relative cooling of the plastic mass in the expander.

While the steam pressure in the expander may be about 300 p.s.i.g. (gauge) or 315 p.s.i.a. (absolute), lower pressures are preferred. The maximum vapor pressure of the water may vary as long as it is sufficient to cause satisfactory expansion of the plastic mass as it is extruded from the expander.

As the heavy plastic mass is extruded through the openings in the die 22, and after the instant of emergence through the openings, the mass expands or explodes to several times its compacted volume because of the sudden escape of steam and compressed gases, thereby forming a porous ribbon or cylinder of more or less rigid, foamed material of significantly reduced moisture content. This ribbon is cut into segments or expanded pellets, preferably one inch in length, by the rotary knife 23 driven through a gear reducer by motor 24.

Since the expanded pellets occupy as much as 8 times the volume of the original cereal material and the mass has been compacted with the expander to about one-third its original volume, it would appear that the degree of expansion is about 24 times the volume of the plastic mass. As the mass is extruded it expands to about 3 times the diameter of the holes 22 in the die, which is equivalent to nine times the cross-sectional area. The linear expansion is two-fold or three-fold, and this would indicate an expansion of the plastic mass to be in the range of 18 to 27 times, with proper control, although expansion outside this range may be obtained by varying the conditions within the expander 17.

As the pellets drop by gravity through a ventilated space 25, from which the moisture vapor and other gases can escape freely, and into hopper 26 from which the pellets are introduced through the pick-up 27 into the air stream of the cooling conveyor 28, air at sufficient velocity to convey the pellets is drawn into the conveyor tube through the air intake 29, circulated through the pellet collector 30 and discharged by fan 31. The cooled pellets, removed from the air stream in the collector are delivered to a pulverizer 31. The material discharged from the pulverizer is elevated through a conveyor tube 32 to a bag-type filter or collector 33 by means of a stream of air drawn into the tube through control damper 34 by fan 35.

The pulverized material removed from the air stream by the collector is delivered to the sifter 36 clothed with wire screens which serve to classify the material into two or more fractions according to particle size. A coarse fraction may be returned to the pulverizer for further grinding, as indicated by the broken line 37. The finer fraction discharged at screen 38 is the final cold water dispersible cereal product. Several types of air classifiers may be used for the final classification operation, instead of the sifter.

A common specification for cereal flours used in the art is "all through 60 mesh and 80% through 80 mesh," referring either to U.S. Bureau of Standards or to Tyler series sieves. While 60 mesh is the preferred size for the products of the present invention, the size is not as critical as it is with ordinary pregel flour products, since in the latter fine grinding is required to break down remaining cellular structure.

The dry, powdered products formed by the process of this invention are inherently dispersible and the cold water dispersion properties thereof are not controlled by the amount of conversion which such products may be later subjected to in order to achieve a level giving a desired performance. Prior art products, on the other hand, have their cold water dispersion properties controlled by the amount of conversion to which they have been subjected, and thus cold water dispersion and conversion occur simultaneously therewith. The term "conversion" refers to depolymerization of the starch material to products generally known as modified starches, dextrins and starch gums.

By the process of the invention, the obtaining of the desired cold water dispersibility properties is entirely separated from the conversion process. Moreover, the expanded flour products obtained by the invention, when modified by acid-conversion give maximum dispersion at any desired level of conversion and, furthermore, give more uniform conversion and require less acid, less time, and lower temperatures to achieve desired level of conversion than do raw flours or pregel flours made by other processes. Dispersibility having been achieved by the process of the invention, an easily controlled and relatively short conversion process then produces the final modified product with dispersibility independent of level of conversion. Briefly stated, the level of conversion (or extent of modification) and degree of dispersibility have been controlled independently of one another, instead of the latter being largely dependent upon the former. Further, the cold water dispersible products so obtained have a controlled average molecular weight of starch fragments, which, of course, is not true of the prior art products unless they are also modified by the process of conversion.

Uniform conversion is desired, i.e. the required level of conversion should be attained with minimum production of sugars (reducing power) and with a minimum of underconverted material. Uniformity of conversion is indicated by the interrelated analytical values for solubilities, viscosity characteristics and reducing sugars. High "reducing sugar" is to be avoided. Actually the figures as used in Table I, referring to reducing sugars as percent dextrose, does not mean that any dextrose is necessarily present, but merely means that the material has a proportion of reducing end-groups (terminal aldehydic groups) sufficient to give the material a reducing power equivalent to that of its percent weight of dextrose. Thus, this term "reducing sugars" relates to "average chain length" of the starchy residue and is fully used and understood in the trade. The amount of reducing sugars, when considered together with other properties, such as viscosity characteristics and solubilities, indicates in an empirical manner whether a conversion or dextrinization has been fairly homogeneous in nature.

The final products of the process illustrated here have properties making them useful for a number of applications without further treatment. However, the products may also be further processed and modified as to solubility and viscosity characteristics. For example, the products may be acidified with a mineral acid such as hydrochloric acid, and heated for a period of time, such as one to two hours, at a temperature of from 75° to 80° C. After cooling, the product is neutralized with ammonia so that a 5% aqueous dispersion has a pH of from about 5.0 to 6.5, and preferably a pH of 6.0. The degree of modification will be determined by the properties desired in the final modified product.

Generally speaking, the strong mineral acids such as hydrochloric acid and sulfuric acid, are preferred catalysts, and should be administered in such amounts that the pH of a 5% slurry of the acidified flour is below about 4.0 and preferably from 3.5 to 2.0. Again, this depends upon the material to be modified. Acid salts have also been used and certain organic acids such as trichloroacetic acid.

Ammonia is the preferred agent, for economic reasons, for neutralizing the acidified material. Because it penetrates to the site of the acidic groups, the dry product is truly neutralized and conversion is thus stopped. If the product has been thus neutralized so that a 5% slurry has a pH of 4.5 to 6.5, further conversion will have been prevented even if the temperature should be as high as the maximum temperature attained during the conversion.

One type of expander 17 which may be utilized is illustrated in FIG. 3, and includes a cylindrical main body 39, having a heavy shell 40. Within the body is an axially positioned segmented or interrupted screw 41 of heavy construction having a central drive shaft 42 which projects through the upper end plate 43 of the body, and through the bearing housing 44, and is affixed to the lower member of thrust bearing 45. This screw is rotated in the direction indicated by the arrow 46 and at moderate speed—usually in the range of from 250 to 400 r.p.m.—by means of a motor and drive arrangement not shown in the drawing. As may be seen, the screw is constructed so that the pitch decreases from the upper or feed end to the lower or discharge end of the cylindrical main body 39.

In the preferred type of construction illustrated in the drawing, the combined features of interruption and decreasing pitch are provided by stacking alternately along the central shaft 42, screw segments 47, each having approximately one turn of a screw, and spacers or bushings 48, with each successive screw segment having a smaller pitch than the segment preceding it.

Usually the inner surface of the cylinder shell and the edges of the screw segments are accurately machined to insure close fit. A number of stationary members 19a and 19b, which may have the form of rods or tubes, project radially from the shell into the central part of the cylinder at each of the interstices of the screw device. The lower, or discharge, end of the cylinder is closed by means of a perforated plate or die 49 having a number of perforations 50 which are preferably round and ¼ to ¾" in diameter.

The lower portion of the cylinder 39 is surrounded by a second shell so as to provide a jacket 52 into which a heating fluid, such as steam, may be introduced. This outer shell is provided with an inlet 53 and an outlet 54 for circulation of the fluid. Rotary knife 23, composed of a hub and several radial blades is positioned below the discharge end of the cylinder and is driven at the desired speed by a drive mechanism consisting of a motor unit 24 with a variable-speed output and a gear reducer 55.

It is to be understood that the expander illustrated in FIG. 3 is merely one of many types of apparatus which may be utilized with the process of the invention.

Merely for illustrative purposes, a number of examples of the process of the invention for forming the cold water dispersible cereal products from dry-milled cereal material will be set forth. Since the industrial cereals industry does not have an adequate number of standard testing procedures, and each supplier and user must usually work out and adopt working methods applicable to his particular requirements, and the usual practice is to use an established procedure or minor variation thereof, whenever possible, test results may have little meaning unless a statement is made of the exact procedures used. For this reason, the procedures adopted for analysis of the materials formed by the processes of the examples are set forth.

The products obtained by the process of the invention cover a broad range of properties, and it has been found that these products can best be typified and differentiated as to those properties which best illustrate their unique characteristics by means of the several methods of analysis; namely, (1) cold water solubility, (2) hot water solubility, (3) reducing sugars, (4) cold water paste viscosity, (5) alkaline paste viscosity, (6) bulk density, and (7) water sorptive capacity.

(1) COLD WATER SOLUBILITY

Cold water solubility determinations are made as follows:

A twenty gram sample of the product, together with approximately 7 grams of a diatomaceous earth filter aid, is placed in a one-quart glass Waring Blendor jar. Five hundred ml. of distilled water at 77±2° F. are added; and the resulting slurry is mixed with the blendor at high speed for 30 seconds, removed from the blendor and shaken for 15 seconds, and finally mixed for another 30 seconds with the blendor. The slurry is filtered through a fluted crepe-surfaced filter paper of medium porosity, such as a Reeve Angel No. 230 paper. A 50 ml. sample of the filtrate is pipetted into a tared glass evaporating dish and is evaporated to dryness on a sand bath with occasional stirring to avoid bumping. The residue is dried to constant weight in an oven at 105° C., and is finally cooled and weighed. The percent of cold water soluble material, on dry basis, is calculated by the following equation:

$$\text{Percent solubles (D.B.)} = \frac{\text{Residue Weight} \times 1000}{\text{Sample Weight} \times (\text{D.S.})}$$

where (D.S.) is the proportion of dry solids in the original sample.

(2) HOT WATER SOLUBILITY

Hot water solubility determinations are made as follows:

A 20 gram sample of the product is dispersed to form a smooth paste with 50 to 75 ml. of distilled water in a 500 ml. Erlenmeyer flask; then, more water is added to bring the total volume to approximately 300 ml. The slurry thus prepared is adjusted to pH of 7.0 to 7.5 by the use of either dilute ammonium hydroxide or dilute hydrochloric acid as required. The slurry is then heated with occasional stirring to a temperature of 190° F., preferably in a water bath, with the heating so regulated that the time required to attain that temperature is 10 to 12 minutes; and the slurry is thereafter allowed to remain at 190° F. for one minute, and is then cooled quickly to around 75° F. The cooked and cooled paste is transferred to a 500 ml. volumetric flask, water is added to fill the flask to the mark, and the diluted paste is thoroughly mixed. The paste is then transferred to a one-quart Waring Blendor jar containing approximately 14 grams of a diatomaceous earth filter aid. The contents of the jar are mixed at high speed for 15 seconds, and are then filtered upon a fluted crepe-surfaced filter paper. A 50 ml. sample of the filtrate is evaporated to dryness and weighed in the same manner as described above for the determination of cold water solubility. Calculation of the percent of hot water solubles is made by means of the equation given above.

(3) REDUCING SUGARS

Reducing sugars are determined in accordance with the procedure of Lane and Eynon, as reported in "Sugar Analysis" by Browne and Zerban, 3rd edition, page 753, published by Wiley and Son, New York (1941). This procedure is applied to the filtrates prepared for the determination of cold water solubility as described above; and usually said filtrates are found to require no further clarification. When clarification is considered beneficial, it is accomplished by means of dry neutral lead acetate followed by deleading with potassium oxalate. The reducing sugar values thus obtained are herein reported as percent dextrose based upon the dry weight of the product.

(4) COLD WATER PASTE VISCOSITY

Cold water paste viscosity determinations are made as follows:

A 10 percent paste or dispersion is made by dispersing a sample of material containing 36.0 grams of dry solids in sufficient distilled water at 25° C. to give a total weight of paste of 360 grams. Dispersion is accomplished by means of moderate mechanical agitation to break up lumps of material and provide a smooth paste. Viscosity is determined with a Brookfield Synchroelectric Model LVF Viscometer, with a No. 2 spindle rotating at 6 r.p.m. Viscosity is expressed as centipoise, as calculated from calibration charts provided by the manufacturer of the Viscometer.

(5) ALKALINE PASTE VISCOSITY

Alkaline paste viscosity is determined as follows:

A 10 percent alkaline paste is prepared at 25° C. by dispersing a sample of material containing 36.0 grams of dry solids in a volume of 0.9 percent aqueous sodium hydroxide solution calculated in mls. by subtracting the total sample weight in grams from 360. Dispersion is accomplished by means of moderate mechanical agitation to provide a smooth paste. Viscosity is determined 30 minutes after preparation of the paste, using a Brookfield Viscometer as described above with No. 3 spindle rotation at 6 r.p.m. Viscosity is expressed in centipoise.

(6) BULK DENSITY

Bulk density is determined as follows:

The material is packed lightly into a container of known weight and volume until said container is level fuls. The preferred method of filling the container is to add the material in increments of such size as to provide successive layers of approximately one-half inch depth, packing after the addition of each increment with a pressure of 0.225 pound per square inch. Said pressure is best applied by placing lightly upon the surface of the material a flat bottom weighted object fitting loosely into the container and having a proper ratio of weight to surface area. After the final packing, the material is struck off level with the top of the container with a straight-edged knife or spatula. The container and contents are then weighed, and the density of the contents is calculated as pounds per cubic foot.

(7) WATER SORPTIVE CAPACITY

Water sorptive capacity (or water sorption) by the effect upon consistency of a plaster slurry is determined as follows:

Thoroughly admix 50 grams of U.S. No. 1 moulding plaster and one gram of starch product by rolling the mixture on a piece of heavy paper about 12″ x 12″ in size. Run a measured volume of water from a buret into a glass evaporating dish of about 60 mm. diameter. Sift the plaster mixture from the paper into the water, and allow the mixture to stand for 30 seconds so that the whole mass of plaster becomes moistened. Stir briskly with a spatula for 100 complete revolutions, reversing direction of the stirring after each tenth revolution. Quickly pour the plaster slurry onto a clean glass plate, starting with the rim of the evaporating dish ½ inch above the plate and ending 3½ inches above the glass plate. Measure two diameters of the resulting plaster patty at right angles to each other, and take the arithmetic average of those two measurements. Repeat the test varying the quantity of water, until a patty is obtained with a standard diameter of 3½ inches.

Make a blank determination in the same manner as directed above, excepting that no starch material is added, until a patty with a standard diameter of 3½ inches is obtained. Water sorption is calculated by the following equation:

$$\text{Water sorption} = 2 \,(\text{Vol. I} - \text{Vol. II})$$

where

Vol. I = volume of water required to make 3½ inch patty in the presence of starch product, and
Vol. II = volume of water required for the 3½ inch patty blank Determinations of moisture content were made in an air oven at 105° C., following the established procedure recognized by the trade.

The following examples describe several embodiments of the invention and show the properties of the products produced thereby. These examples are for purposes of illustration and are intended to be informative only; they are not to be considered in any sense as limiting the scope of the invention.

Example 1

Sorghum grits, graded to pass through a 9-mesh wire screen but to remain upon a 20-mesh wire screen, at an original moisture content of 11.4 percent, were sprayed with cold water to raise the moisture content to 17.5 percent and were fed immediately into the Expander, allowing no time for aging or conditioning. No additional water or steam was added during the expansion process. Steam pressure in the jacket of the Expander was maintained at 110 p.s.i.g. The expanded pellets were cooled in a stream of air and were then ground in a pulverizer so that the final cold water dispersible product passed through a 60-mesh screen.

The product was readily dispersible in water at 25° C., and had the properties set forth in Table I.

Example 2

Sorghum grits as in Example 1 were sprayed with water to increase moisture content to 20 percent, and were allowed to condition in a closed bin at 25° C. for 24 hours. The conditioned grits were then fed into the Expander at a rate 1.8 times that used in Example 1. As in Example 1, no water or steam was added during the expansion process. Steam pressure in the jacket of the Exapnder was 140 p.s.i.g. The expanded pellets were cooled and ground as before.

The final product passed through a 60-mesh wire screen, was readily dispersible in water at 25° C., and had the properties set forth in Table I.

Example 3

A meal prepared by cutting sorghum grits in a buhr mill to granulation such that all passed through a 20-mesh wire screen and 35 percent passed through a 100-mesh wire screen, and at an original moisture content of 11.0 percent, was sprayed with water to raise the moisture content to 21.7 percent and was fed without aging into the Expander at a rate 1.5 times that attained in Example 1. Steam pressure in the jacket of the Expander was 135 p.s.i.g. The expanded pellets were cooled and ground as in Examples 1 and 2.

The final product had the properties set forth in Table I.

Example 4

A sorghum flour of fine granulation, all passing through an 80-mesh wire screen and 80 percent passing through a 100-mesh screen, and at an original moisture content of 10.5 percent, was sprayed with water to raise the moisture content to 21.3 percent and was fed without aging into the Expander at a rate 2.0 times that attained in Example 1. Steam pressure in the jacket of the Expander was 140 p.s.i.g. The expanded pellets were cooled and ground as in earlier examples.

The product had the properties set forth in Table I.

Example 5

The product of Example 2 was acidified by spraying with 20° Baumé hydrochloric acid at the rate of 4.0 ml. acid per pound of product; and the acidified material was heated with agitation in a vented dextrine cooker. Heating time was one hour, and maximum temperature attained by the material was 75° C. After discharge from the cooker, the product was cooled and neutralized with ammonia so that a 5 percent aqueous dispersion had a pH of 6.0.

The product had the properties set forth in Table I.

Example 6

The product of Example 2 was acidified by spraying with 20° Baumé hydrochloric acid at the rate of 5.0 ml. acid per pound of product; and was heated in a dextrine cooker as in Example 5. Heating time was 2 hours; maximum temperature of the material was 80° C., the temperature having been controlled within the range 75° to 80° C. during the second hour of heating. After discharged from the cooker, the product was cooled and was neutralized as before with ammonia.

The product had the properties set forth in Table I.

Example 7

Sorghum grits (as in Examples 1 and 2) were moistened to 17% moisture content and allowed to temper for 3 hours, after which time additional moisture was added by water and steam to increase moisture to 24% and temperature to 130–160° F. The grits were heated at that temperature and in a controlled draft of air for approximately 10 minutes, during which time moisture content was reduced to 21% and uniform permeation of moisture throughout the grits was achieved. Then, these conditioned grits were passed between gas-fired rolls having a surface temperature of 420–460° F. and maintained under tension.

The product had the properties set forth in Table I.

Example 8

The product formed in Example 7 was acidified with 20° Baumé hydrochloric acid at the rate of 5.20 ml. acid per pound of product and the acidified material was heated with agitation in a vented dextrine cooker. Heating time was 1 hour and 45 minutes and maximum temperature obtained by the material was 79° C. After discharge from the cooker, the product was cooled and neutralized as in Example 5. The properties of the product are set forth in Table I.

Example 9

Raw sorghum flour was acidified with 20° Baumé hydrochloric acid at the rate of 4.2 ml. acid per pound of flour, and the acidified material was heated for 2 hours and 45 minutes with the maximum temperature obtained by the material being 129° C. The product was then cooled and neutralized as in Example 5. The properties of the product are set forth in Table I.

The properties of the products of the above processes are compared in Table I.

TABLE I

| Properties | Examples | | | | | | | | |
|---|---|---|---|---|---|---|---|---|---|
| | 1 | 2 | 3 | 4 | 5 | 6 | 7 | 8 | 9 |
| Cold Water Solubility, percent dry basis | 53.9 | 66.9 | 63.5 | 65.0 | 73.8 | 84.5 | 21.5 | 75.7 | 27.6 |
| Hot Water Solubility, percent, dry basis | 69.7 | 83.8 | 70.0 | 73.9 | 86.1 | 87.8 | 67.1 | 84.6 | 82.1 |
| Moisture Content, percent | 8.1 | 8.4 | 7.6 | 9.1 | 8.4 | 8.3 | 5.2 | 6.2 | 8.5 |
| Reducing Sugars, percent dextrose | 0.15 | 0.17 | 0.19 | 0.19 | 0.64 | 1.60 | .34 | 2.59 | 2.0 |
| Viscosity of 10% Cold Water Paste, cps | 280 | 1,170 | 3,290 | 2,350 | 70 | 20 | 840 | 30 | 45 |
| Viscosity of 10% Alkaline paste, cps | 5,300 | 4,400 | 4,300 | 5,100 | 80 | 10 | 2,440 | 30 | 30 |
| Bulk Density, lbs. per cu. ft | 44.7 | 41.7 | 44.4 | 43.4 | 43.6 | 45.5 | 19.1 | 33.8 | 45.0 |
| Water Sorptive Capacity | 18 | 19 | 17 | 17 | 10 | 2 | 13 | 4 | 2 |

From a comparative study of the results obtained in Table I, it is readily apparent that the cold water solubility of products obtained by the process of the invention, prior to modification (Examples 1 to 4 inclusive) is vastly superior to that obtained by the process of the prior art (Example 7) or by the conversion of raw sorghum flour (Example 9).

Also, the water-sorptive capacity of the products of the invention, prior to modification, is vastly improved. Water-sorptive capacity of prior art products is usually from 10 to 13 at the most, while that of the products of the present invention ranges from 17 to 19, and it is possible to obtain a measurement up to 21. Further, it is unique to obtain a product having a high bulk density and a high degree of cold water dispersibility as shown in Examples 1 to 6 inclusive. While the cold water dispersibility properties of the prior art product of Example 7 may be improved by conversion with an acid (see Example 8), there is an extremely high reducing power in the resulting product, together with a reduction in viscosity and in water-sorptive capacity.

On the other hand, further modification of the products of the invention, as exemplified in 1-4 of Table I can be controlled to provide uniform deploymerization to a desired range of viscosity or water sorption characteristics with relatively little change in solubilities and without excessive increase in reducing sugars.

Thus, it is readily evident that the products of the invention have excellent cold water dispersibility characteristics, which are entirely independent of conversion, and these products may then be converted to the desired degree, depending upon the end use of the desired product. The prior art products, on the other hand, while giving good cold water dispersibility characteristics, such characteristics are directly dependent to a considerable extent on the amount of conversion (depolymerization) to which the cereal is subjected.

A commercially satisfactory product is one no coarser than 40 mesh size, which has cold water solubility of at least 50% and preferably up to 75% and higher, a reducing sugar content of less than .25, high water sorption of from 13 to 20 and a bulk density of from 40 to 45 lbs./cubic foot. Such a product may then be modified by acidic conversion to adjust it to particular specifications, depending upon end use thereof.

The dry, powdered cold water dispersible products obtained by the process of this invention are useful as adhesives, binders, sizes, as additives in the manufacture of gypsum wall board, and in many other industrial applications.

Having fully described the invention, what is claimed is:

1. The process of making a cereal product from a starch-bearing cereal material, said product having a cold water solubility of from about 50 to 75%, having a bulk density of about 40–45 lbs. per cubic foot, and having a high water sorptive capacity of from 13 to 20, consisting essentially of the steps of bringing the moisture content of said material to about 15 to 40% by weight of said material, compressing and shearing said moistened material into a compacted plastic mass wherein the cereal tissue is disintegrated while maintaining said mass at a temperature of at least 100° C. and a pressure sufficient to maintain the water therein in a condensed state, said pressure being less than about 300 p.s.i.g., rapidly decreasing said pressure to vaporize said water within said plastic mass to expand said mass into a substantially rigid porous foamed ribbon, and comminuting said ribbon to powdered form.

2. The process as defined in claim 1 wherein said starch-bearing cereal material is selected from the group consisting of corn, wheat, barley, sorghum and rye.

3. The process as defined in claim 1 wherein said starch-bearing cereal material is sorghum.

4. The process as defined in claim 1 wherein said expanded mass is pelletized and the resulting pellets are comminuted to a fine size up to and including 40 mesh.

5. The process as defined in claim 1 wherein the powdered cereal product formed is admixed with a mineral acid at elevated temperature for a period of time sufficient to at least partially convert the product and neutralizing said acidified product to stop conversion.

6. The process of making a cereal product from starch-bearing cereal material, said product having a cold water solubility of from about 50 to 75 percent, having a bulk density of about 40–45 pounds per cubic foot and having a high water-sorptive capacity of from 13 to 20 consisting essentially of the steps of adjusting the moisture content of said material to about 15 to 40% by weight of said material, compressing and shearing said moistened material into a compacted plastic mass wherein the cereal tissue is disintegrated while maintaining said mass at a temperature of at least 100° C. and a pressure sufficient to maintain the water in a condensed state therein, said pressure being less than about 300 p.s.i.g. and rapidly decreasing said pressure to vaporize said water within said plastic mass to expand said mass to about 18 to 27 times its volume and forming a substantially rigid porous foamed ribbon and pelletizing said ribbon.

7. A cold water dispersible starch-bearing cereal material having a cold water solubility of from about 50 to 75%, a bulk density of about 40–45 pounds per cubic foot, a high water sorptive capacity of from 13 to 20, and a reducing sugar content of less than .25.

8. The cereal material as defined in claim 7 wherein the material is in pellet form.

9. The cereal material as defined in claim 7 wherein said material is in granular form.

10. The process as defined in claim 6 wherein the moisture content of said material is adjusted to about 15–40% by weight of said material by blending water and steam with said material.

References Cited by the Examiner

UNITED STATES PATENTS

| | | | |
|---|---|---|---|
| 707,892 | 8/1902 | Anderson | 99—82 |
| 1,725,171 | 8/1929 | Anderson | 99—82 |
| 1,758,272 | 5/1930 | Anderson | 99—80 |
| 1,933,158 | 10/1933 | Bohn et al. | 99—82 |
| 2,060,408 | 11/1936 | Wood | 99—80 |
| 2,466,172 | 4/1949 | Kesler et al. | 106—150 |
| 2,838,401 | 6/1958 | Gates | 99—82 |
| 2,900,268 | 8/1959 | Rankin et al. | 106—150 |
| 2,954,296 | 9/1960 | Clausi et al. | 99—82 |
| 3,054,677 | 9/1962 | Graham et al. | 99—82 |
| 3,062,657 | 11/1962 | Vollink | 99—80 |
| 3,077,406 | 2/1963 | Benson | 99—82 |

ALEXANDER H. BRODMERKEL, *Primary Examiner.*

JOSEPH REBOLD, MORRIS LIEBMAN, *Examiners.*

D. J. ARNOLD, *Assistant Examiner.*